United States Patent
Wu et al.

(10) Patent No.: US 11,736,286 B2
(45) Date of Patent: Aug. 22, 2023

(54) METHOD AND SECURE BOOT CONTROL CIRCUIT FOR CONTROLLING SECURE BOOT OF ELECTRONIC DEVICE AND METHOD FOR CONTROLLING ENROLLMENT OF ELECTRONIC DEVICE

(71) Applicant: PUFsecurity Corporation, Hsinchu County (TW)

(72) Inventors: Meng-Yi Wu, Hsinchu County (TW); Chia-Cho Wu, Hsinchu County (TW); Ching-Sung Yang, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 113 days.

(21) Appl. No.: 17/544,952

(22) Filed: Dec. 8, 2021

(65) Prior Publication Data

US 2022/0188422 A1    Jun. 16, 2022

Related U.S. Application Data

(60) Provisional application No. 63/124,085, filed on Dec. 11, 2020.

(51) Int. Cl.
*H04L 9/32* (2006.01)
*H04L 9/08* (2006.01)
(Continued)

(52) U.S. Cl.
CPC .......... *H04L 9/0866* (2013.01); *G06F 9/4401* (2013.01); *G06F 21/575* (2013.01);
(Continued)

(58) Field of Classification Search
CPC ..... H04L 9/0866; H04L 9/085; H04L 9/0894; H04L 9/3228; H04L 9/3234;
(Continued)

(56) References Cited

U.S. PATENT DOCUMENTS

| 10,615,989 B2 | 4/2020 | Kreft |
| 2010/0146261 A1* | 6/2010 | Talstra .................... G06F 21/10 713/176 |

(Continued)

FOREIGN PATENT DOCUMENTS

| CN | 108958650 A | 12/2018 |
| CN | 111818039 A | 10/2020 |

*Primary Examiner* — Izunna Okeke
(74) *Attorney, Agent, or Firm* — Winston Hsu

(57) ABSTRACT

A method and a secure boot control circuit for controlling a secure boot of an electronic device. The method is applicable to the secure boot control circuit, and the electronic device includes the secure boot control circuit. The method includes: checking randomness of an output of an entropy source of the secure boot control circuit to generate a check result; utilizing the entropy source to provide a random number sequence; generating a reference code according to the random number sequence; comparing the reference code with an activation code stored in the secure boot control circuit to generate a comparison result; and determining whether to enable at least one function of the electronic device according to at least one of the check result and the comparison result.

15 Claims, 11 Drawing Sheets

(51) Int. Cl.
*G06F 9/4401* (2018.01)
*G06F 21/57* (2013.01)

(52) U.S. Cl.
CPC ............ *H04L 9/085* (2013.01); *H04L 9/0894* (2013.01); *H04L 9/3228* (2013.01); *H04L 9/3234* (2013.01); *H04L 9/3278* (2013.01); *G06F 2221/034* (2013.01)

(58) Field of Classification Search
CPC ... H04L 9/3278; H04L 9/0869; H04L 9/3247; G06F 9/4401; G06F 21/575; G06F 2221/034; G06F 7/588; G06F 21/10; G06F 21/73; G09C 1/00
See application file for complete search history.

(56) References Cited

U.S. PATENT DOCUMENTS

2014/0189890 A1* 7/2014 Koeberl ................... G09C 1/00
726/34
2020/0342112 A1* 10/2020 Plusquellic ........... G06F 21/602

\* cited by examiner

METHOD AND SECURE BOOT CONTROL CIRCUIT FOR CONTROLLING SECURE BOOT OF ELECTRONIC DEVICE AND METHOD FOR CONTROLLING ENROLLMENT OF ELECTRONIC DEVICE

CROSS REFERENCE TO RELATED APPLICATIONS

This application claims the benefit of U.S. provisional application No. 63/124,085, which was filed on Dec. 11, 2020, and is included herein by reference.

BACKGROUND OF THE INVENTION

1. Field of the Invention

The present invention is related to anti-reverse-engineering, anti-cloning and anti-overproduction, and more particularly, to a method and a secure boot control circuit for controlling a secure boot of an electronic device and a method for controlling enrollment of an electronic device.

2. Description of the Prior Art

When an integrated circuit (IC) design house finishes the design of an IC, the IC will be manufactured by a third party such as a wafer foundry. Even though the IC design house requests the wafer foundry to manufacture only a certain number of ICs with respect to the design, the ICs are typically overproduced in practice. Under some conditions, the overproduced ICs might be obtained by some people who are unauthorized by the IC design house. Thus, secure boot control is required in order to prevent unauthorized people from utilizing the overproduced ICs.

In addition, there are analyzing tools that are capable of performing reverse engineering of a Graphic Data System (GDS) file of the design of the IC, in order to obtain internal architecture of the IC. Thus, there is a need for a novel method and an associated electronic device, to prevent chips from being malicious reverse-engineered or cloned by GDS analysis and reverse techniques.

SUMMARY OF THE INVENTION

Thus, an objective of the present invention is to provide a method and a secure boot control circuit for controlling a secure boot of an electronic device and a method for controlling enrollment of an electronic device, to solve the problems of the related art.

At least one embodiment of the present invention provides a method for controlling a secure boot of an electronic device. The method is applicable to a secure boot control circuit of the electronic device, and the method comprises: checking randomness of an output of an entropy source of the secure boot control circuit to generate a check result; utilizing the entropy source to provide a random number sequence; generating a reference code according to the random number sequence; comparing the reference code with an activation code stored in the secure boot control circuit to generate a comparison result; and determining whether to enable at least one function of the electronic device according to at least one of the check result and the comparison result.

At least one embodiment of the present invention provides a method for controlling enrollment of an electronic device. The method comprises: utilizing a signing device to send a nonce to a secure boot control circuit of the electronic device; utilizing the secure boot control circuit to generate a response based on a first shared key of the electronic device and the nonce; utilizing the signing device to generate an encoding result based on a first shared key of the signing device and the nonce; utilizing the signing device to determine whether to write an activation code into the electronic device, wherein the activation code is generated according to the first shared key and a bit sequence.

At least one embodiment of the present invention provides a secure boot control circuit for controlling a secure boot of an electronic device, where the electronic device comprises the secure boot control circuit. The secure boot control circuit comprises an anti-tampering circuit, a first digital circuit and a second digital circuit. The anti-tampering circuit comprises an entropy source, and the entropy source is configured to provide a random number sequence. The first digital circuit is coupled to the anti-tampering circuit, and is configured to control readout of the random number sequence. The second digital circuit is coupled to the first digital circuit, and is configured to control operations of the secure boot of the electronic device. More particularly, the second digital circuit checks randomness of an output of the entropy source to generate a check result; the second digital circuit generates a reference code according to the random number sequence; the second digital circuit compares the reference code with an activation code stored in the secure boot control circuit to generate a comparison result; and the second digital circuit determines whether to enable at least one function of the electronic device according to at least one of the check result and the comparison result.

The method and the secure boot control circuit provided by the embodiments of the present invention can take an output of the entropy source as a fingerprint of an electronic device after the entropy source is initialized. In addition, an activation code corresponding to this fingerprint needs to be written into the secure boot control circuit in order to activate the electronic device comprising the secure boot control circuit. As the fingerprint is unable or hard to be reverse-engineered or cloned by the analyzing tools of the related art, it is guaranteed that only the authorized electronic device has the correct activation code, thereby preventing maliciously cloned chips or over-produced chips from being activated or utilized.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
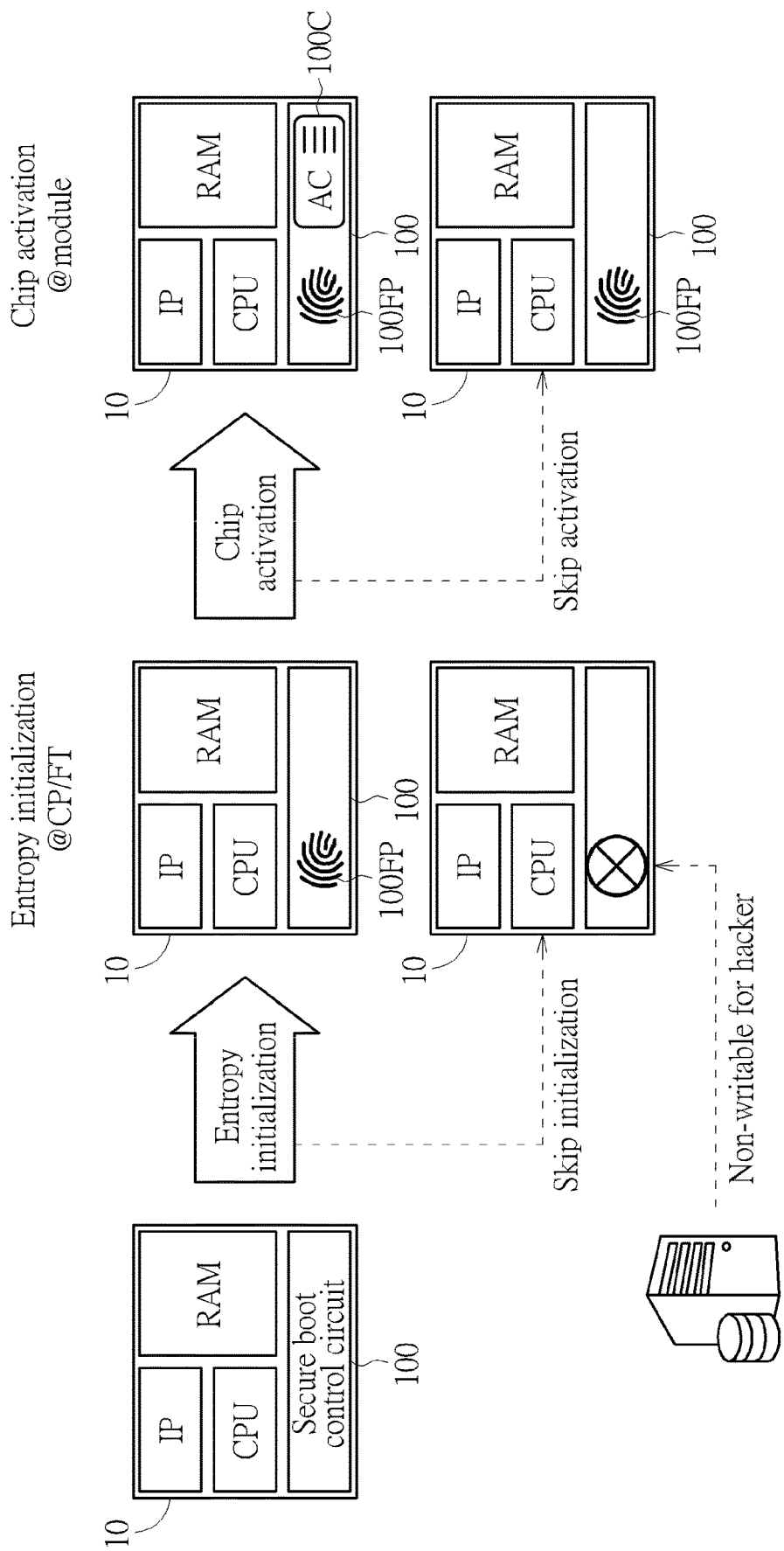
FIG. 1 is a diagram illustrating a manufacturing flow of an electronic device according to an embodiment of the present invention.

FIG. 1 is a diagram illustrating a manufacturing flow of an electronic device such as a System on a Chip (SoC) 10 according to an embodiment of the present invention. The SoC 10 comprises a secure boot control circuit 100. In this embodiment, the secure boot control circuit 100 comprises entropy sources. Entropy sources can be implemented with a static entropy (e.g. Physical Unclonable Function (PUF) devices) or a dynamic entropy (e.g. a true random number generator (TRNG)), but the present invention is not limited thereto. In addition, the SoC 10 further comprises a central processing unit (CPU), a random access memory (RAM) and at least one functional circuit (labeled "IP" in FIG. 1 for brevity), but the present invention is not limited thereto.

When the SoC 10 is manufactured at a chip probing (CP) phase or a final test (FT) phase, the manufacturer performs an entropy initialization on the SoC 10 (more particularly, on the entropy sources of the secure boot control circuit 100 therein) to make the secure boot control circuit 100 (e.g., the entropy sources therein) generate a unique pattern 100FP of the SoC 10, and the unique pattern 100FP can be regarded as a fingerprint of the SoC 10. As the unique pattern 100FP is generated on hardware inside the SoC 10 after the entropy initialization, a hacker is unable or hard to perform reverse-engineering on the unique pattern 100FP. Thus, a maliciously cloned chip (e.g., which skips the step of entropy initialization) does not have a valid fingerprint, and a boot procedure of this cloned chip would be interrupted due to lack of the valid fingerprint, thereby achieving the purpose of anti-cloning. In addition, the secure boot control circuit 100 comprises at least one analog functional circuit and some digital circuits which are implemented based on a customized cell library, and the secure boot control circuit 100 is therefore unable or hard to be reverse-engineered by a reverse engineering technique of the related art, thereby achieving the purpose of anti-reverse-engineering.

When manufacturing process of the SoC 10 proceeds with chip activation on a module such as a printed circuit board (PCB), a signing tool is coupled to the SoC 10 in order to write an activation code 100C (labeled "AC" in FIG. 1 for brevity) in to an one-time programmable (OTP) memory of the SoC 10, where correctness of the activation code 100C stored in the SoC 10 will be checked during a secure boot procedure of the SoC 10. In some embodiment, the signing tool is configured to activate a specific number of chips only, a boot procedure of an overproduced chip would be interrupted due to lack of the correct activation code, thereby achieving the purpose of anti-overproduction.

Figure 2:
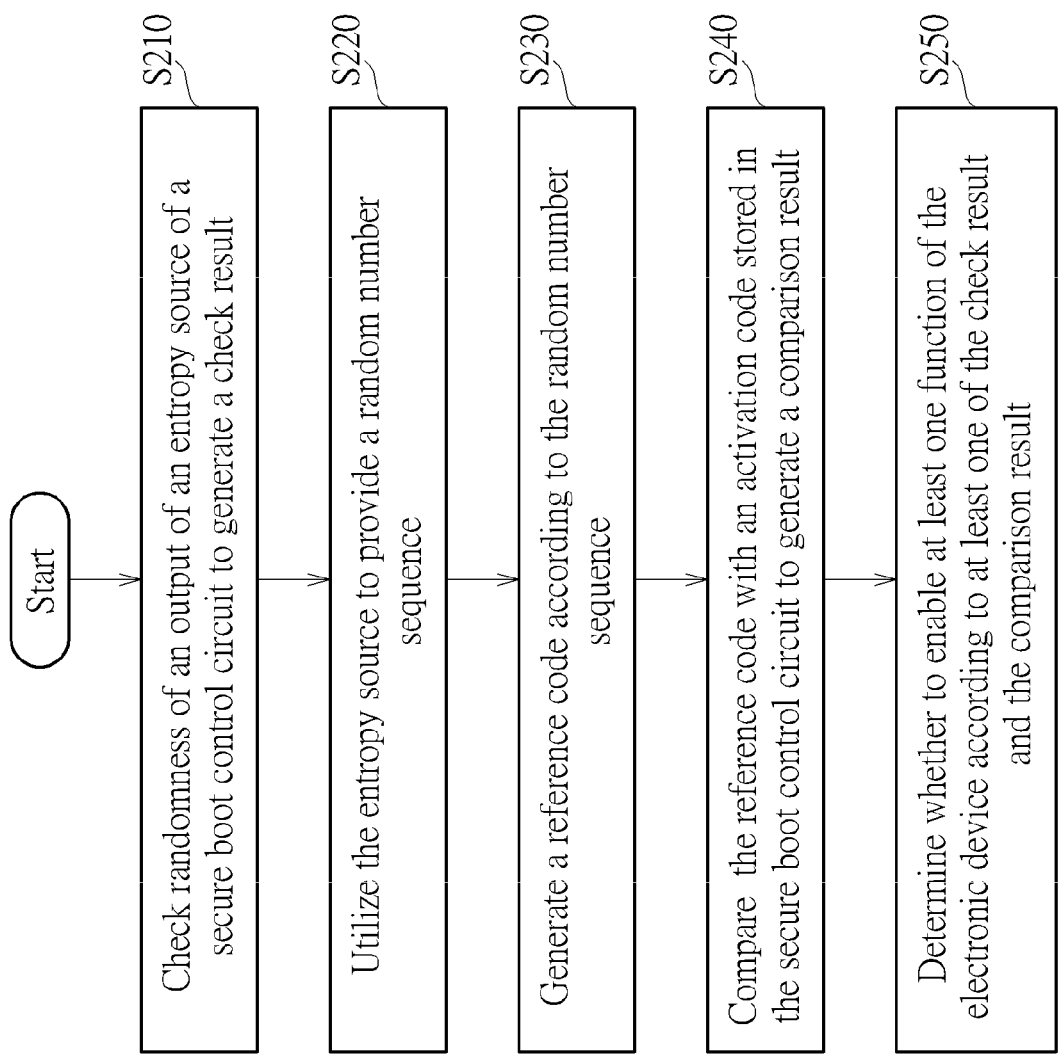
FIG. 2 is a diagram illustrating a working flow of a method for controlling a secure boot of the electronic device shown in FIG. 1 according to an embodiment of the present invention.

FIG. 2 is a diagram illustrating a working flow of a method for controlling a secure boot of an electronic device (e.g., the SoC 10 shown in FIG. 1) according to an embodiment of the present invention, where the method is applicable to a secure boot control circuit (e.g., the secure boot control circuit 100 shown in FIG. 1) of the electronic device. It should be noted that one or more steps may be added, deleted or modified in the working flow shown in FIG. 2. In addition, if a same result can be obtained, these steps do not have to be executed in the exact order shown in FIG. 2.

In Step S210, the secure boot control circuit 100 checks randomness of an output of an entropy source (e.g., a PUF source or a TRNG) of the secure boot control circuit 100 to generate a check result.

In Step S220, the secure boot control circuit 100 utilizes the entropy source to provide a random number sequence according to the check result.

In Step S230, the secure boot control circuit 100 generates a reference code according to the random number sequence.

In Step S240, the secure boot control circuit 100 compares the reference code with an activation code (e.g., the activation code 100C shown in FIG. 1) stored in the secure boot control circuit 100 (e.g., an OTP memory therein) to generate a comparison result.

In Step S250, the secure boot control circuit 100 determines whether to enable at least one function of the electronic device (e.g., the SoC 10) according to at least one of the check result and the comparison result. In some embodiment, when the check result indicates that the randomness of the output of the entropy source (e.g., the fingerprint such as the unique pattern 100FP shown in FIG. 1) fails to meet predetermined criteria, the working flow may end in Step S210, and Steps S220 to S240 may be skipped, but the present invention is not limited thereto.

Figure 3:
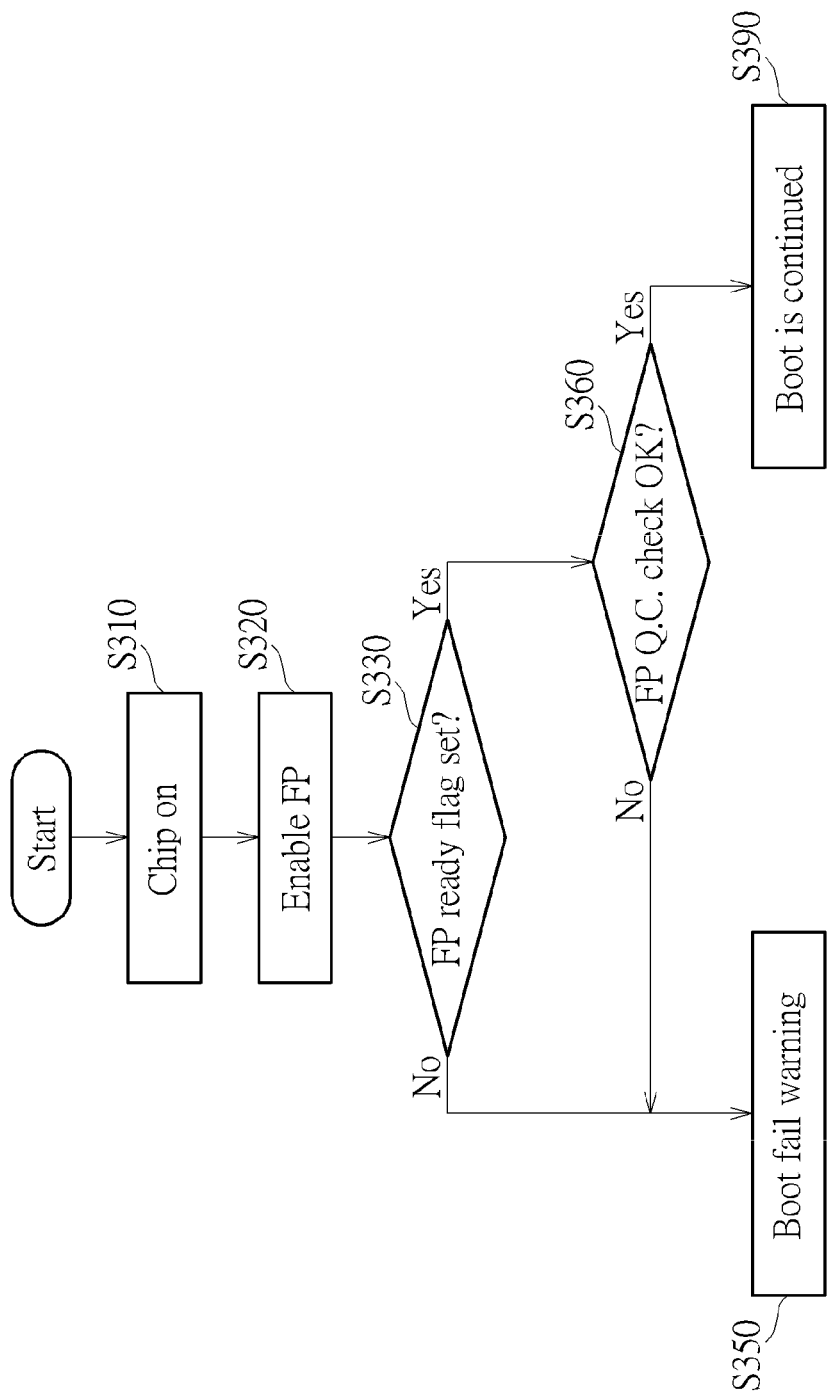
FIG. 3 is a diagram illustrating a control scheme related to the method shown in FIG. 2 according to an embodiment of the present invention.

FIG. 3 is a diagram illustrating a control scheme related to the method shown in FIG. 2 according to an embodiment of the present invention. It should be noted that one or more steps may be added, deleted or modified in the working flow shown in FIG. 3. In addition, if a same result can be obtained, these steps do not have to be executed in the exact order shown in FIG. 3. In this embodiment, it is assumed that the entropy initialization of the SoC 10 (e.g., the secure boot control circuit 100) is finished, that is to say the fingerprint such as the unique pattern 100FP of the SOC is generated.

In Step S310, the SoC 10 is powered on (labeled "Chip on" in FIG. 3 for brevity).

In Step S320, the SoC 10 enables the fingerprint thereof (labeled "Enable FP" in FIG. 3 for brevity). For example, the SoC 10 power on the secure boot control circuit 100 to make the unique pattern 100FP readable.

In Step S330, the SoC 10 performs a ready check of the fingerprint of the SoC 10 in order to check whether the fingerprint of the SoC 10 is ready, and accordingly generate a ready check result. In some embodiment, the secure boot control circuit 100 comprises a counter (not shown in FIG. 1) in order to generate a counting result, where the counting result is configured to indicate a time period starting from a time point of the SoC 10 being powered on. A ready flag of the fingerprint of the secure boot control circuit 100 can be set in response to the counting result indicating that the time period reaches a predetermined time threshold. For example, the SoC 10 checks whether the flag of the entropy source of the secure boot control circuit 100 is set (labeled "FP ready flag check?" in FIG. 3 for brevity). If the ready check result shows "Yes", the flow proceeds with Step S360; and if the ready check result shows "No", the flow proceeds with Step S350.

In Step S350, the secure boot of the SoC 10 fails (labeled "Boot fail warning" in FIG. 3 for brevity). In some embodiment, when the secure boot of the SoC 10 fails, all functions of the SoC 10 are disabled and the SoC 10 will be powered off. In some embodiment, when the secure boot of the SoC 10 fails, an overall boot of the SoC 10 will be continued, but at least one function of the SoC 10 is disabled (e.g., kept inactive). For example, the secure boot control circuit 100 may issue a boot fail warning signal to the CPU of the SoC 10, and the CPU may disable all functional block(s), module(s) and/or circuit(s) of the SoC 10 in response to the boot fail warning signal. In another example, when the CPU of the SoC 10 receives the boot fail warning signal from the secure boot control circuit 100, the CPU may disable a portion of functional block(s), module(s) and/or circuit(s) of the SoC 10 in response to the boot fail warning signal. In yet another example, when the CPU of the SoC 10 receives the boot fail warning signal from the secure boot control circuit 100, the CPU may ignore the boot fail warning signal and the boot procedure of SoC 10 may be continued.

In Step S360, the secure boot of the SoC 10 checks the randomness of the output of the entropy source (e.g., the fingerprint such as the unique pattern 100FP) of the secure boot control circuit 100 by calculating a randomness parameter (e.g., hamming weight) of the output of the entropy source of the secure boot control circuit 100, in order to check whether the randomness (e.g., the randomness parameter such as the hamming weight) of the output of the entropy source of the secure boot control circuit 100 meets a predetermined criteria, to generate a quality check (QC) result (labeled "FP Q.C. check OK?" in FIG. 3 for brevity). If the QC result shows "Yes", the flow proceeds with Step S390; and if the QC result shows "No", the flow proceeds with Step S350. In particular, after the flag is set, the randomness of the output of the entropy source (e.g., the fingerprint such as the unique pattern 100FP) of the secure boot control circuit 100 is expected to meet the predetermined criteria if the entropy initialization of the SoC 10 is properly performed. If the entropy initialization of a certain chip is skipped, randomness of a fingerprint of this chip (e.g., the unique pattern 100FP of the SoC 10) will fail to meet the predetermined criteria. Thus, the QC result can be configured to determine whether the unique pattern 100FP exists (e.g., to determine whether the entropy initialization is properly performed).

In Step S390, the secure boot of the SoC 10 is continued (labeled "Boot is continued" in FIG. 3 for brevity).

In this embodiment, the operation of checking the randomness of the output of the entropy source (e.g., the fingerprint such as the unique pattern 100FP) of the secure boot control circuit 100 is performed after the flag is set, which ensures that the operation of checking the randomness of the output of the entropy source (e.g., the fingerprint such as the unique pattern 100FP) of the secure boot control circuit 100 is performed after the existence of the unique pattern 100FP is ensured.

Figure 4:
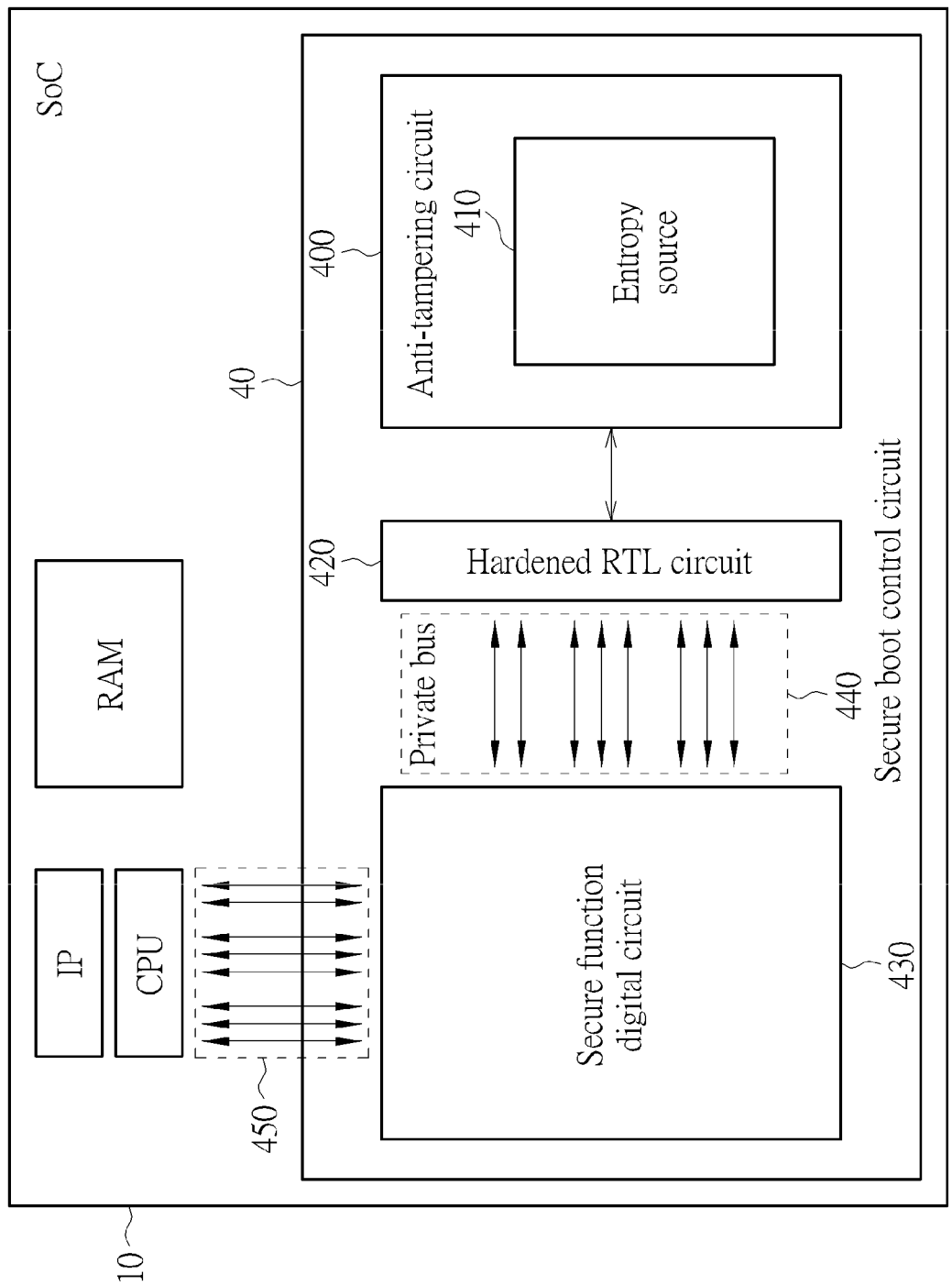
FIG. 4 is a diagram illustrating a secure boot control circuit for controlling a secure boot of the electronic device shown in FIG. 1 according to an embodiment of the present invention.

FIG. 4 is a diagram illustrating a secure boot control circuit 40 for controlling a secure boot of an electronic device (e.g., the SoC 10 shown in FIG. 1) according to an embodiment of the present invention, where the secure boot control circuit 40 is an example of the secure boot control circuit 100. As shown in FIG. 4, the secure boot control circuit 40 comprises an anti-tampering circuit 400, a first digital circuit such as a hardened register-transfer level (RTL) circuit 420 and a second digital circuit such as a secure function digital circuit 430. The anti-tampering circuit 400 comprises an entropy source 410 (e.g., a PUF source or a TRNG), where after the entropy initialization mentioned above, the entropy source 410 is configured to provide a random number sequence (e.g. the fingerprint such as the unique pattern 100FP). The hardened RTL circuit 420 is coupled to the anti-tampering circuit 400, and is configured to control readout of the random number sequence (e.g., the fingerprint such as the unique pattern 100FP). For example, the hardened RTL circuit 420 performs logic control on an output of the entropy source 410 in order to allow the output (e.g., the random number sequence) of the entropy source 410 to be read out from the anti-tampering circuit 400 through a private bus 440. The secure function digital circuit 430 is coupled to the hardened RTL circuit 420 via the private bus 440, and is configured to control operations of the secure boot of SoC 10 (e.g., configured to control the working flow shown in FIG. 3). For example, the secure function digital circuit 430 is coupled to the CPU of the SoC 10 via a standard interface 450, where the secure function digital circuit 430 receives commands from the CPU of the SoC 10, and the secure function digital circuit 430 executes steps corresponding to these commands and respond corresponding data to the CPU. In particular, the secure function digital circuit 430 checks randomness of an output of the entropy source (the random number sequence, e.g., the fingerprint such as the unique pattern 100FP) to generate a check result. Thereafter the secure function digital circuit 430 generates a reference code according to the random number sequence. The secure function digital circuit 430 compares the reference code with an activation code (e.g., the activation code 100C shown in FIG. 1) stored in the secure boot control circuit 40 to generate a comparison result. If the comparison result is not matched, a boot fail warning is received and the subsequent boot procedure is determined by the CPU of the SoC 10.

In this embodiment, the entropy source 410 can be implemented based on hard macro such as a PUF-based entropy source with static entropy or a TRNG-based entropy source with dynamic jitter and post-processing. The output of the PUF-based entropy source or a TRNG-based entropy source can have good statistics features as random numbers, which is unable or hard to be cloned or cracked from outside of the secure boot control circuit 40, and the output of the PUF-based entropy source or a TRNG-based entropy source can be initialized as a fingerprint (e.g., the unique pattern 100FP) of the SoC 10. For example, after the PUF-based entropy source or the TRNG-based entropy source is initialized, the PUF-based entropy source or the TRNG-based entropy source can generate a random number sequence (e.g., the fingerprint such as the unique pattern 100FP) for usage of subsequent operations. In addition, the anti-tampering circuit 400 further comprises analog circuits such as a voltage band-gap circuit and sense amplifiers which can be implemented based on a customized cell library (e.g. proprietary library), and therefore is unable or hard to be reverse-engineered by reverse engineering techniques. Furthermore, digital control circuits within the hardened RTL circuit 420 can also be implemented based on a customized cell library, where in comparison with using a standard cell library provided by a fabrication plant, the digital control circuits implemented based on the customized cell library (which is established by an integrated circuit design house) is less likely to be reverse-engineered by reverse engineering techniques.

Figure 5:
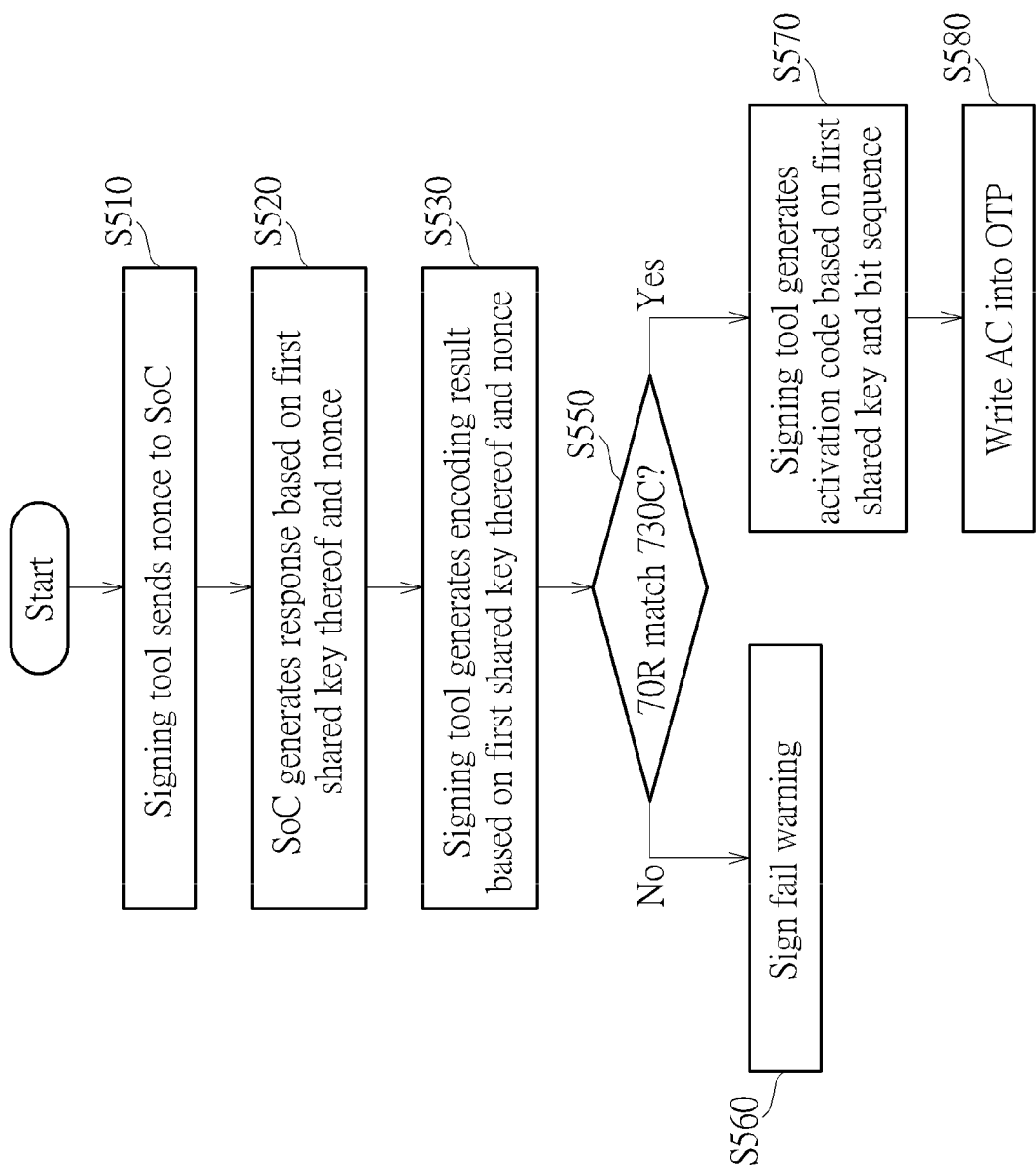
FIG. 5 is a diagram illustrating a working flow of a method for controlling enrollment of the electronic device shown in FIG. 1 according to an embodiment of the present invention.
Figure 6:
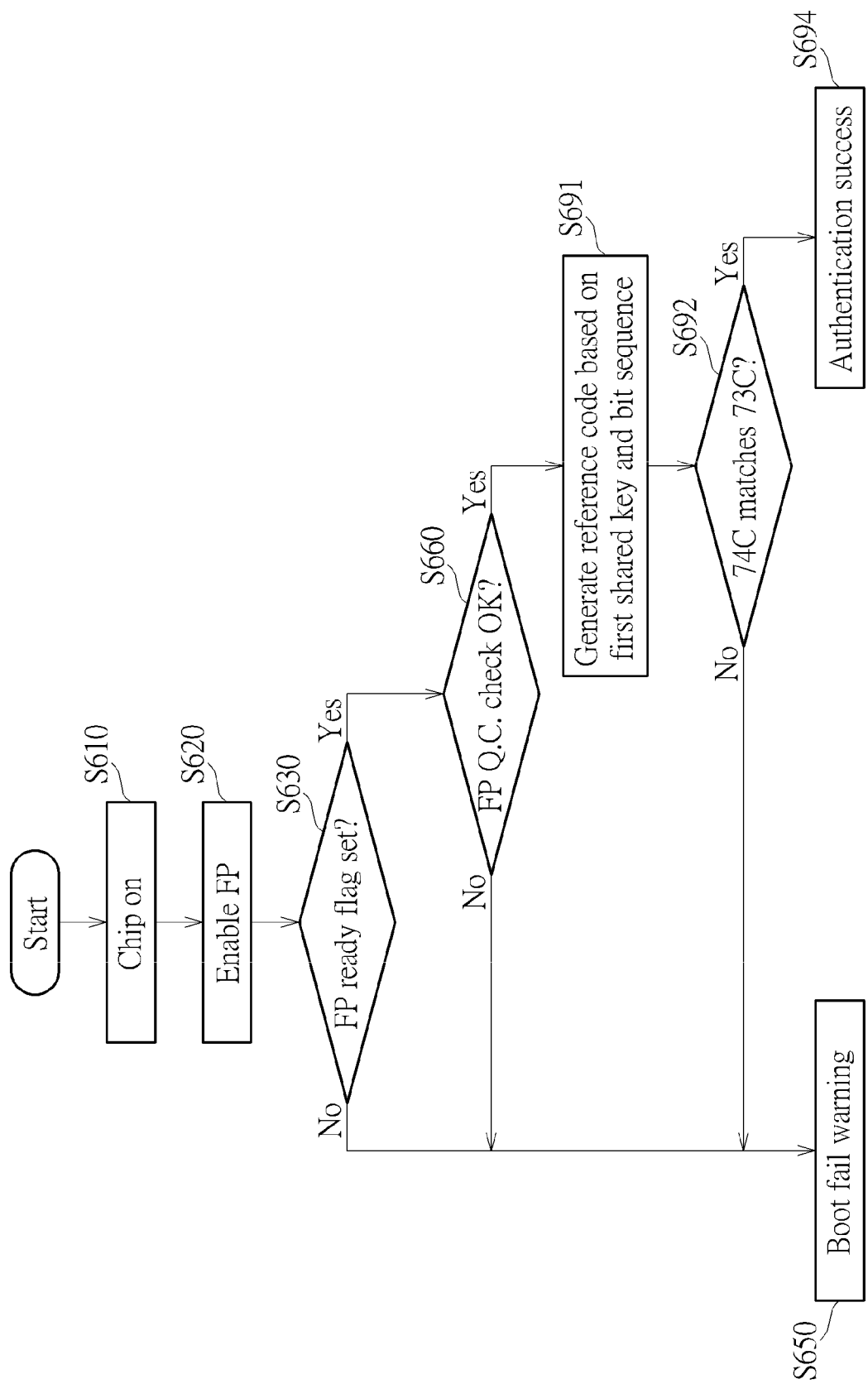
FIG. 6 is a diagram illustrating a working flow of a secure boot control scheme of the electronic device shown in FIG. 1 after being performed the enrollment shown in FIG. 5 according to an embodiment of the present invention.

FIG. 5 is a diagram illustrating a working flow of a method for controlling enrollment of an electronic device (e.g. the SoC 10 shown in FIG. 1) (e.g., enrollment with a signing device) according to an embodiment of the present invention, and FIG. 6 is a diagram illustrating a working flow of a secure boot control scheme of the electronic device after being performed the enrollment shown in FIG. 5 according to an embodiment of the present invention. In the embodiments of FIG. 5 and FIG. 6, it is assumed that the entropy initialization of the electronic device is finished.

Figure 7:
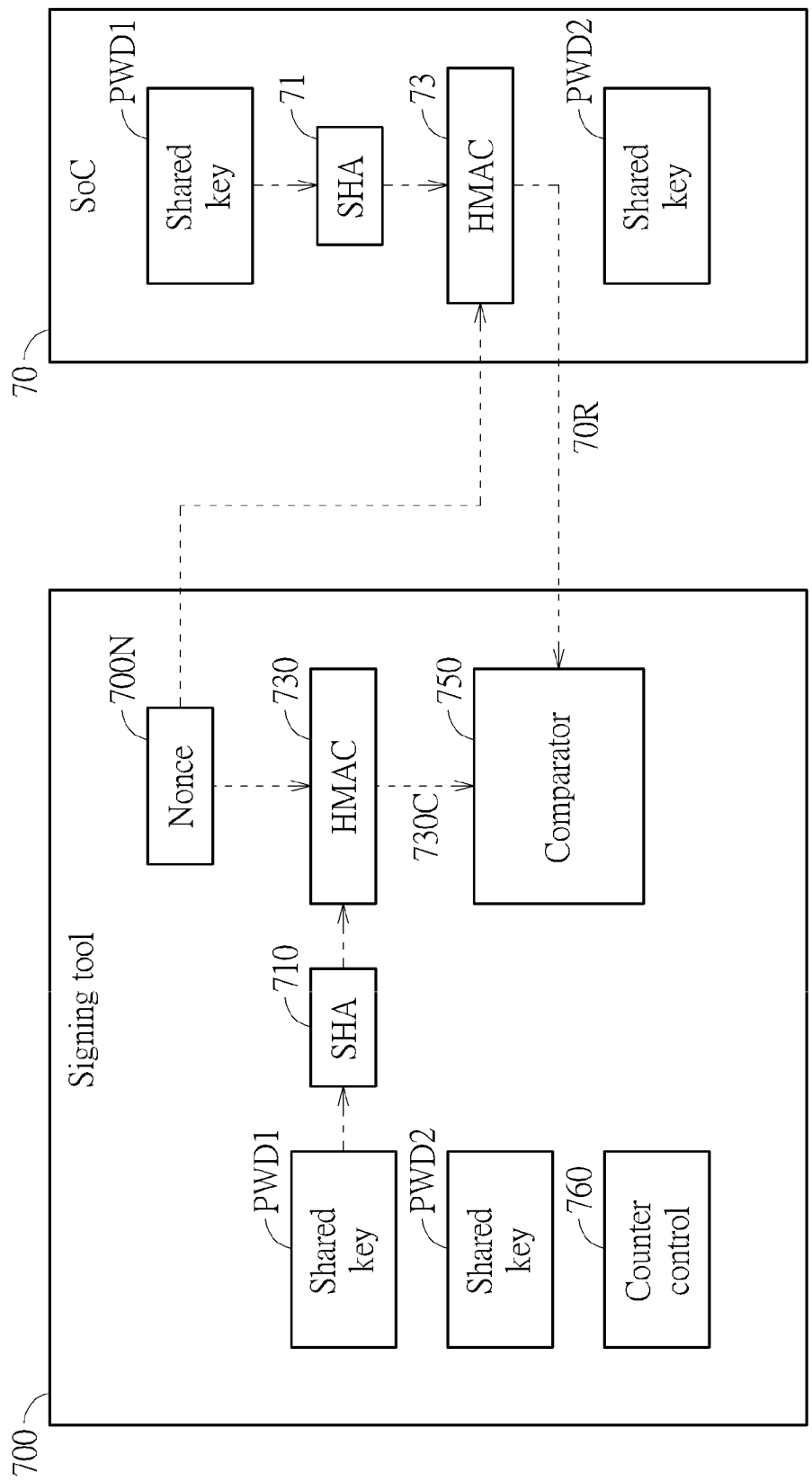
FIG. 7 is a diagram illustrating a signing device performing a portion of the working flow shown in FIG. 5 with an electronic device according to an embodiment of the present invention.
Figure 8:
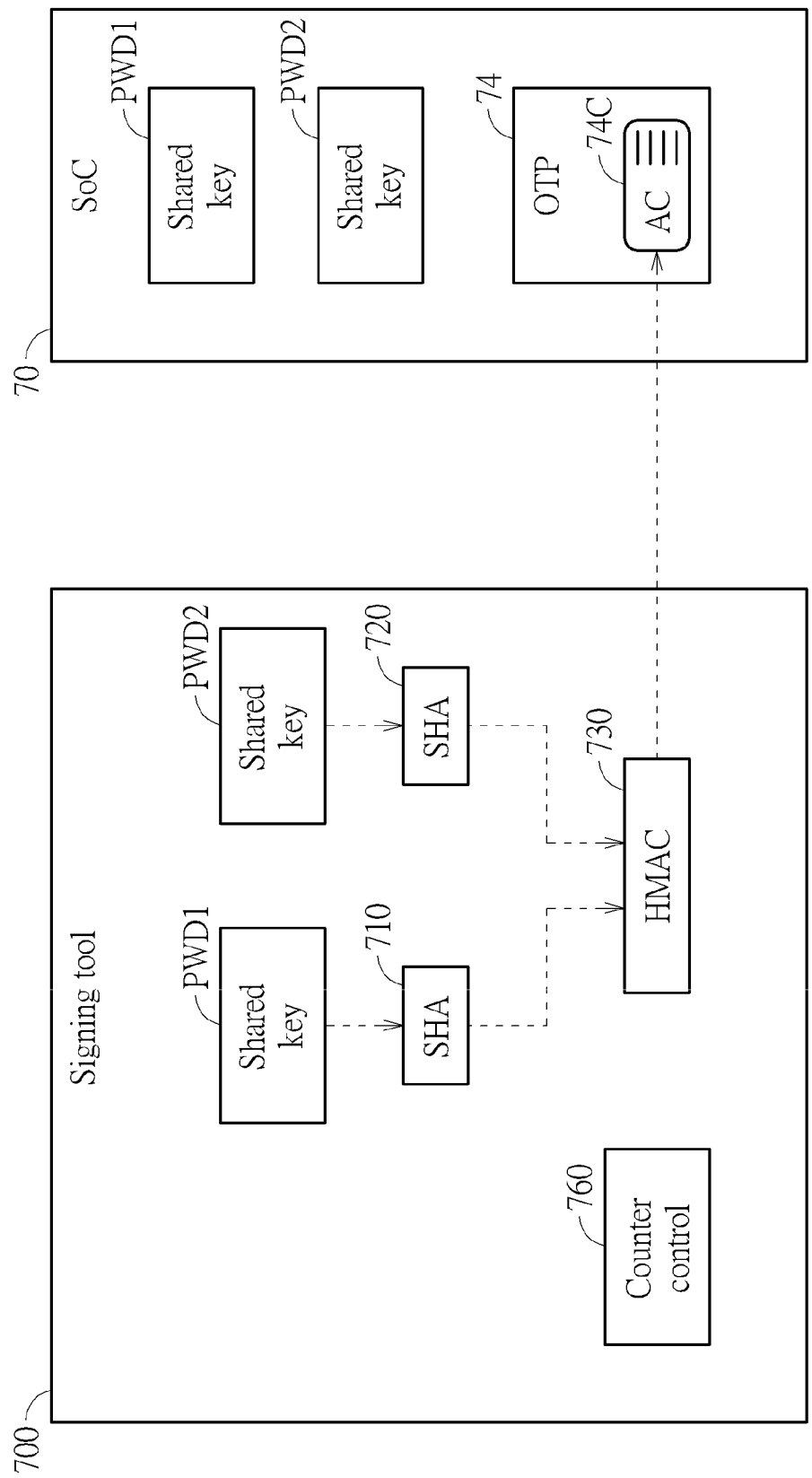
FIG. 8 is a diagram illustrating a signing device performing another portion of the working flow shown in FIG. 5 with an electronic device according to an embodiment of the present invention.
Figure 9:
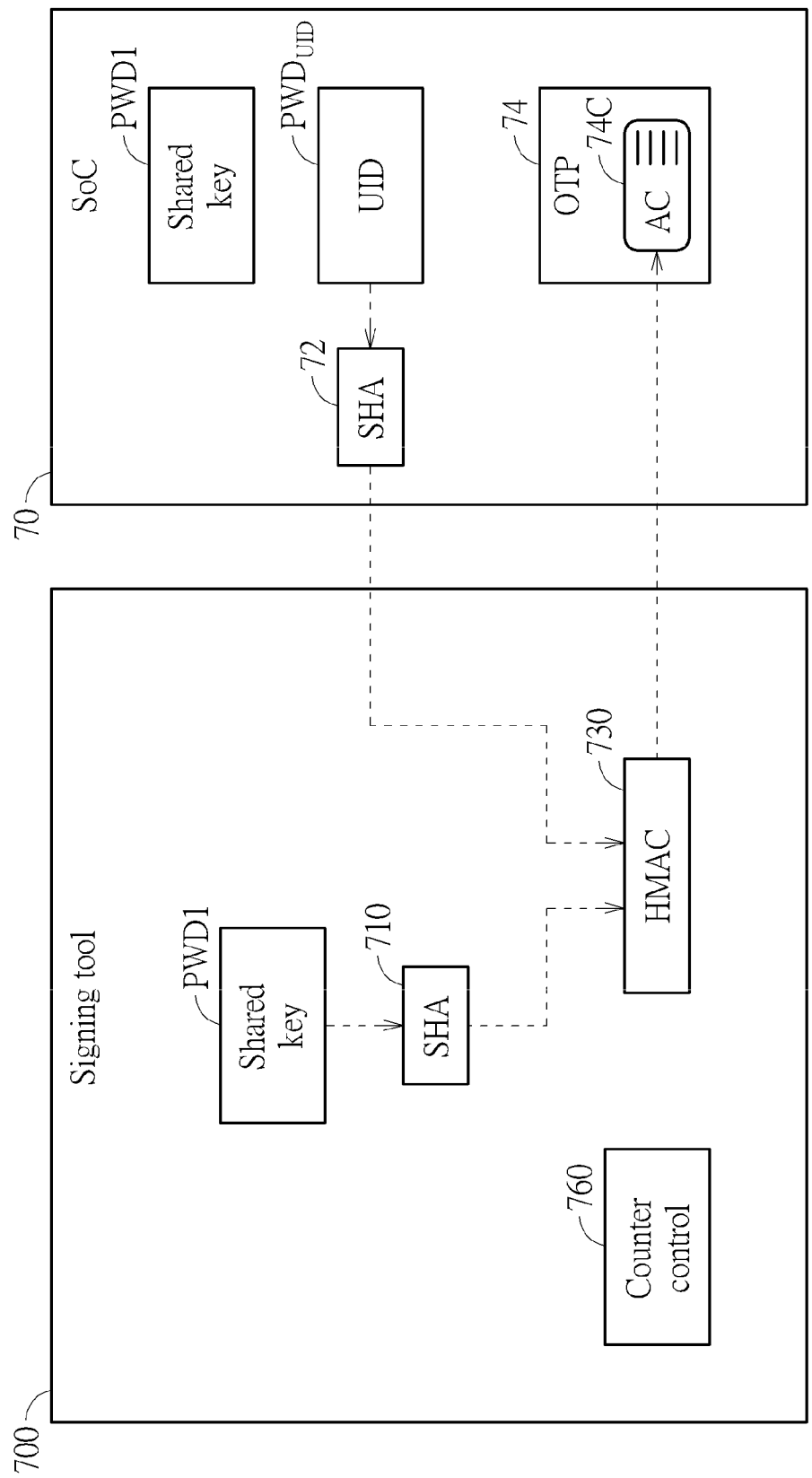
FIG. 9 is a diagram illustrating a signing device performing another portion of the working flow shown in FIG. 5 with an electronic device according to another embodiment of the present invention.

For better comprehension of FIG. 5, please refer to FIG. 7 to FIG. 9. FIG. 7 is a diagram illustrating a signing device such as a signing tool 700 performing steps S510 to S550 of FIG. 5 with a SoC 70 (which may be an example of the SoC 10 shown in FIG. 1 or the SoC 10 shown in FIG. 4) according to an embodiment of the present invention. FIG. 8 is a diagram illustrating the signing tool 700 performing steps S570 to S580 of FIG. 5 with the SoC 70 (which may be an example of the SoC 10 shown in FIG. 1 or the SoC 10 shown in FIG. 4) according to an embodiment of the present invention. FIG. 9 is a diagram illustrating the signing tool 700 performing steps S570 to S580 of FIG. 5 with the SoC 70 (which may be an example of the SoC 10 shown in FIG. 1 or the SoC 10 shown in FIG. 4) according to another embodiment of the present invention. In some embodiments, the signing tool 700 can be implemented in a Universal Serial Bus (USB) dongle or a computer, but the present invention is not limited thereto. It should be noted that one or more steps may be added, deleted or modified in the working flow shown in FIG. 5. In addition, if a same result can be obtained, these steps do not have to be executed in the exact order shown in FIG. 5.

In Step S510, the signing tool 700 is coupled to the SoC 70 (to a secure boot control circuit therein such as the secure boot control circuit 100 or 40), an enrollment procedure begins, and the signing tool 700 sends a nonce (e.g., a nonce 700N shown in FIG. 7) to the SoC 70.

In Step S520, the SoC 70 (e.g., secure boot control circuit therein) generates a response 70R based on a first shared key (e.g., a shared key PWD1) of the SoC 70 and the nonce 700N. For example, the SoC 70 performs a Secure Hash Algorithm (SHA) 71 on the shared key PWD1 of the SoC 70 to generate a result of the SHA 71, and the SoC 70 performs a Hash-based message authentication code (HMAC) algorithm 73 on the nonce 700N and the result of the SHA 71 to generate the response 70R to the signing tool 700. In some embodiment, a combination of the SHA 71 and the HMAC algorithm 73 may be replaced with a Cipher-based message authentication code (CMAC) algorithm.

In Step S530, the signing tool 700 generates an encoding result 730C based on a first shared key (e.g., a shared key PWD1) of the signing tool 700 and the nonce 700N. As shown in FIG. 7, the signing tool 700 performs a SHA 710 on the first shared key PWD1 of the signing tool 700 to generate a result of the SHA 710. The signing tool 700 performs a HMAC algorithm 730 on the nonce 700N and the result of the SHA 710 to generate the encoding result 730C. In some embodiment, when the combination of the SHA 71 and the HMAC algorithm 73 is replaced with the CMAC algorithm, a combination of the SHA 710 and the HMAC algorithm 730 executed in the signing tool 700 is also replaced with a CMAC algorithm same as the SoC 70.

In Step S550, the signing tool 700 determines whether the response 70R from the SoC 70 matches the encoding result 730C (labeled "70R match 730C?" in FIG. 5 for brevity). For example, the signing tool 700 utilizes a comparator 750 therein to compare the response 70R from the SoC 70 and the encoding result 730C, to generate an enrollment result. If the enrollment result shows "Yes" (e.g., the response 70R from the SoC 70 matches the encoding result 730C), it means the first shared key of the signing tool 700 is identical to the first shared key of the SoC 70 (e.g., the signing tool 700 and the SoC 70 have the same shared key such as PWD1), the flow proceeds with Step S570; and if the enrollment result shows "No" (e.g., the response 70R from the SoC 70 fails to match the encoding result 730C), it means the first shared key of the signing tool 700 is not identical to the first shared key of the SoC 70 (SoC 70 may be a counterfeit) and the flow proceeds with Step S560.

In Step S560, the signing tool 700 issues a sign fail warning, where a subsequent operation in response to the sign fail warning may be determined according to requirements of the manufacturer. For example, the signing tool 700 may prevent writing any activation code into the SoC 70, and the SoC 70 is therefore kept inactive.

In Step S570, the signing tool 700 generates an activation code 74C based on the shared key PWD1 and a bit sequence. In one embodiment, the bit sequence may be a shared key PWD2 of the signing tool 700 as shown in FIG. 8. In another embodiment, the bit sequence may be a unique identifier (UID) $PWD_{UID}$ (e.g., the fingerprint such as the unique pattern 100FP shown in FIG. 1) from the SoC 70 as shown in FIG. 9.

In Step S580, the SoC 70 writes the activation code 74C into an OTP memory 74 of SoC 70 (e.g., the OTP memory of the secure boot control circuit 100 shown in FIG. 1 or an OTP memory of the secure boot control circuit 40), and this step is labeled "Write AC into OTP" in FIG. 5 for brevity.

In an embodiment of FIG. 8, the signing tool 700 performs a predetermined algorithm (e.g., the HMAC algorithm 730) on the first shared key (e.g., the shared key PWD1) of the signing tool 700 and a second shared key (e.g., the shared key PWD2) of the signing tool 700, to generate the activation code 74C for being written into the OTP memory 74 of the SoC 70. For example, the signing tool 700 performs the SHA 710 on the shared key PWD1 to generate the result of the SHA 710, and further performs a SHA 720 on the shared key PWD2 to generate a result of the SHA 720, where the signing tool 700 performs the HMAC algorithm 730 on the results of the SHA 710 and the SHA 720 to generate the activation code 74C. In the embodiment of FIG. 8, the shared key PWD2 of the signing tool 700 is stored in the signing tool 700 in advance, e.g., the shared key PWD2 of the signing tool 700 is stored in the signing tool 700 before the signing tool 700 performs the enrollment procedure with the SoC 70.

In the embodiment of FIG. 9, the fingerprint of the SoC 70 is provided by an entropy source (e.g., the entropy source 410 shown in FIG. 4) of the SoC 70, and the UID $PWD_{UID}$ of the SoC 70 may be an example of the fingerprint such as the unique pattern 100FP shown in FIG. 1. In order to allow the signing tool 700 to generate the correct activation code (e.g., making the activation code 74C be generated according to the UID $PWD_{UID}$), the signing tool 700 may receive an encoding result of the UID $PWD_{UID}$ from the SoC 70 after the enrollment result of Step S550 is match. For example, the SoC 70 performs a SHA 72 on a bit sequence such as the UID $PWD_{UID}$ of SoC 70 to generate a result of the SHA 72, and the signing tool 700 receives the result of the SHA 72 from the SoC 70, where the signing tool 700 performs the HMAC algorithm 730 on the results of the SHA 710 and the SHA 72 to generate the activation code 74C.

In some embodiment, the signing tool 700 comprises a counter control 760 which is configured to generate an activation record for indicating how many chips have been activated by the signing tool 700. For example, before the signing tool 700 starts to perform the enrollment procedure with the SoC 70, the signing tool 700 checks the activation record to determine whether the number of activated chips reaches a predetermined activation threshold. If the activation record indicates that the number of activated chips has not reached the predetermined activation threshold yet, the signing tool 700 is able to perform the enrollment procedure with the SoC 70 and generate the activation code 74C as mentioned above. If the activation record indicates that the number of activated chips has reached the predetermined activation threshold, the signing tool 700 is unable to perform the enrollment procedure with the SoC 70 (e.g., the enrollment procedure may be prohibited in response to the activation record indicating that the number of activated chips has reached the predetermined activation threshold), and the SoC 70 will not be activated. Thus, the number of chips being activated can be effectively controlled, thereby preventing the overproduced chip from being activated or preventing overproduction.

Figure 10:
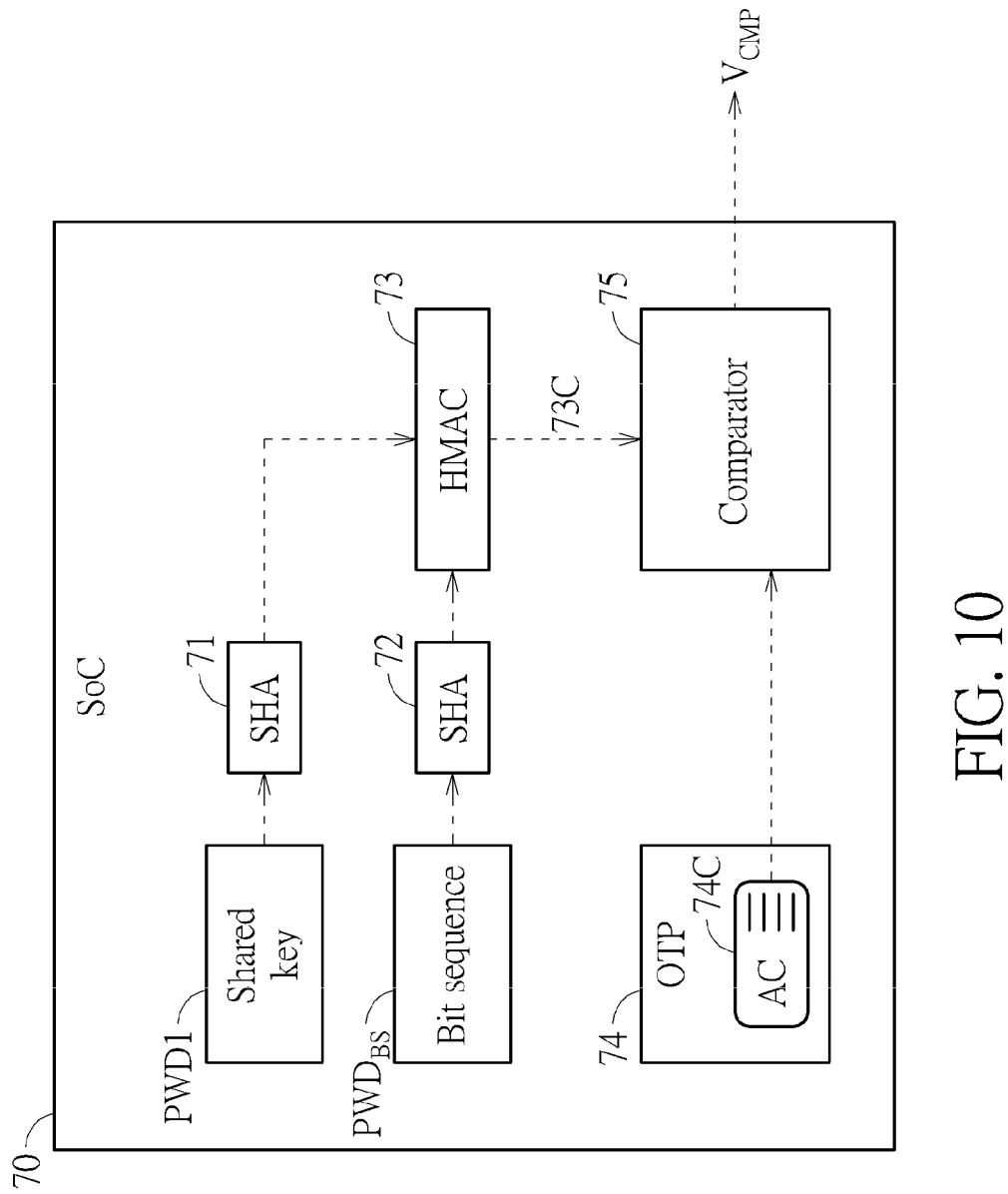
FIG. 10 is a diagram illustrating a control scheme related to authentication of an activation code of an electronic device according to an embodiment of the present invention.
Figure 11:
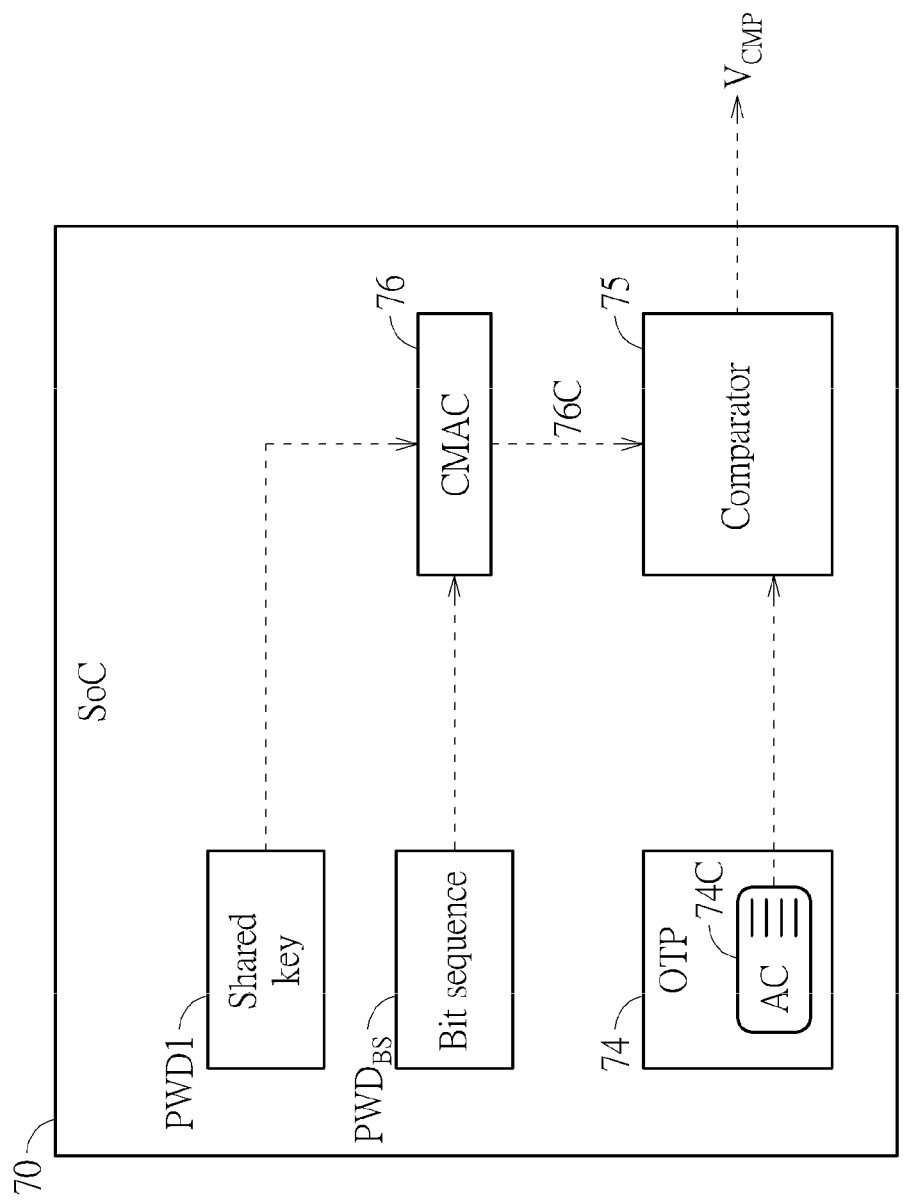
FIG. 11 is a diagram illustrating a control scheme related to authentication of an activation code of an electronic device according to another embodiment of the present invention.

For better comprehension of FIG. 6, please refer to FIG. 10 and FIG. 11. FIG. 10 is a diagram illustrating a control scheme related to the SoC 70 performing authentication of an activation code according to an embodiment of the present invention. FIG. 11 is a diagram illustrating a control scheme related to the SoC 70 performing authentication of an activation code according to another embodiment of the present invention. It should be noted that one or more steps may be added, deleted or modified in the working flow shown in FIG. 6. If a same result can be obtained, these steps do not have to be executed in the exact order shown in FIG. 6.

Operations of Steps S610 to S660 are similar to Steps 310 to S360 illustrated in the embodiment of FIG. 3, and are omitted here for brevity, where when the QC result of Step 660 shows "Yes", the flow proceeds with Step S691.

In Step S691, the SoC 70 generates a reference code 73C (which may be an example of the reference code mentioned in the embodiment of FIG. 4) based on the first shared key (e.g., the shared key PWD1) of the SoC 70 and a bit sequence $PWD_{BS}$. In one embodiment, the shared key PWD2 of the SoC 70 shown in FIG. 8 may be an example of the bit sequence $PWD_{BS}$. In another embodiment, the UID $PWD_{UID}$ of the SoC 70 shown in FIG. 9 may be an example of the bit sequence $PWD_{BS}$.

As mentioned in the previous embodiment, the flag of the entropy source of the secure boot control circuit 100 (e.g., the entropy source 410 of the secure boot control circuit 40 shown in FIG. 4) can be set in response to the counting result indicating that the time period reaches the predetermined time threshold. In addition, the bit sequence $PWD_{UID}$ (e.g., the UID $PWD_{UID}$) may be provided by an entropy source of the SoC 70 (e.g., the entropy source 410 shown in FIG. 4) in the embodiment of FIG. 9. Thus, the operation of generating the reference code 73C is performed after the flag is set, which ensures that the operation of generating the reference code 73C is performed after the entropy source of the SoC 70 (e.g., the entropy source 410 shown in FIG. 4) and the readout circuits thereof are ready to properly output the bit sequence $PWD_{UID}$ such as the UID $PWD_{UID}$ (e.g., ready to output the unique pattern 100FP).

As shown in FIG. 10, the SoC 70 performs the SHA 71 on the shared key PWD1 to generate the result of the SHA 71, and further performs the SHA 72 on the bit sequence $PWD_{BS}$ to generate the result of the SHA 72, where the SoC 70 performs the HMAC algorithm 73 on the results of the SHA 71 and the SHA 72 to generate the reference code 73C, and the SoC 70 utilizes a comparator 75 therein to compare the activation code 74C stored in the OTP memory 74 with the reference code 73C to generate a comparison result $V_{CMP}$. In some embodiment, a combination of the SHA 71, the SHA 72 and the HMAC algorithm 73 is replaced with a CMAC algorithm 76 as shown in FIG. 11, and a reference code 76C generated by the CMAC algorithm 76 may be an example of the reference code 73C, but the present invention is not limited thereto.

In Step S692, the SoC 70 determines whether the activation code 74C stored in the OTP memory 74 matches the reference code 73C according to the comparison result $V_{CMP}$ (labeled "74C matches 73C?" in FIG. 6 for brevity). If the comparison result $V_{CMP}$ shows the activation code matches the reference code 73C, it means the correct activation code (e.g., the activation code 74C) is stored in the OTP memory 74, and the flow proceeds with Step S694; and if the comparison result $V_{CMP}$ shows the activation code fails to match the reference code 73C, it means the SoC 70 is not activated by the signing tool 700, and the flow proceeds with Step S650.

In Step S694, the authentication of the activation code 74C is finished and successful (labeled "Authentication success" in FIG. 6 for brevity).

To summarize, the method and the secure boot control circuit provided by the embodiments of the present invention can take an output of the entropy source as a fingerprint of an electronic device comprising the secure boot control circuit. In addition, an activation code corresponding to this fingerprint needs to be written into the secure boot control circuit via a signing device in order to activate the electronic device. As the fingerprint is unable or hard to be reverse-engineered or cloned by the analyzing tools of the related art, it is guaranteed that only the signing tool (which has the shared key same as the electronic device) is able to write the correct activation code into the electronic device. Thus, the present invention can prevent maliciously cloned chips or over-produced chips from being activated or utilized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a secure boot of an electronic device, wherein the method is applicable to a secure boot control circuit of the electronic device, and the method comprises:
    checking randomness of an output of an entropy source of the secure boot control circuit to generate a check result;
    utilizing the entropy source to provide a random number sequence;
    generating a reference code according to the random number sequence;

comparing the reference code with an activation code stored in the secure boot control circuit to generate a comparison result; and determining whether to enable at least one function of the electronic device according to at least one of the check result and the comparison result;

wherein a flag of the entropy source is set in response to a time period, the time period starting from a time point of the electronic device being powered on, reaching a predetermined threshold, operations of checking the randomness of the output of the entropy source and generating the reference code are performed after the flag is set, and determining whether to enable the at least one function of the electronic device according to the at least one of the check result and the comparison result comprises:

in response to the check result indicating that the randomness of the output of the entropy source fails to meet a predetermined criteria, a boot fail warning is issued.

2. A method for controlling a secure boot of an electronic device, wherein the method is applicable to a secure boot control circuit of the electronic device, and the method comprises:

checking randomness of an output of an entropy source of the secure boot control circuit to generate a check result;

utilizing the entropy source to provide a random number sequence;

generating a reference code according to the random number sequence;

comparing the reference code with an activation code stored in the secure boot control circuit to generate a comparison result; and determining whether to enable at least one function of the electronic device according to at least one of the check result and the comparison result;

wherein a flag of the entropy source is set in response to a time period, the time period starting from a time point of the electronic device being powered on, reaching a predetermined threshold, operations of checking the randomness of the output of the entropy source and generating the reference code are performed after the flag is set, and determining whether to enable the at least one function of the electronic device according to the at least one of the check result and the comparison result comprises:

in response to the comparison result indicating that the activation code fails to match the reference code, a boot fail warning is issued.

3. The method of claim 1, further comprising:

utilizing a signing device to perform an enrollment procedure with the electronic device; and after the enrollment procedure is finished, utilizing the signing device to send the activation code to the electronic device, wherein the activation code from the signing device is written into the secure boot control circuit of the electronic device.

4. The method of claim 3, wherein the enrollment procedure is configured to determine whether a first shared key of the signing device is identical to a first shared key of the electronic device.

5. The method of claim 3, wherein utilizing the signing device to send the activation code to the electronic device comprises:

utilizing the signing device to perform a predetermined algorithm based on a first shared key of the signing device and a bit sequence, to generate the activation code for being written into the secure boot control circuit of the electronic device.

6. The method of claim 5, wherein generating the reference code according to the random number sequence comprises:

utilizing the secure boot control circuit to perform the predetermined algorithm based on a first shared key of the electronic device and the random number sequence, to generate the reference code.

7. The method of claim 1, wherein the entropy source of the secure boot control circuit can be implemented with a static entropy or a dynamic entropy.

8. A secure boot control circuit for controlling a secure boot of an electronic device, the electronic device comprising the secure boot control circuit, the secure boot control circuit comprising:

an anti-tampering circuit, comprising:
an entropy source, configured to provide a random number sequence;

a first digital circuit, coupled to the anti-tampering circuit, configured to control readout of the random number sequence; and a second digital circuit, coupled to the first digital circuit, configured to control operations of the secure boot of the electronic device, wherein:

the second digital circuit checks randomness of an output of the entropy source to generate a check result;

the second digital circuit generates a reference code according to the random number sequence;

the second digital circuit compares the reference code with an activation code stored in the secure boot control circuit to generate a comparison result; and the second digital circuit determines whether to enable at least one function of the electronic device according to at least one of the check result and the comparison result;

wherein a flag of the entropy source is set in response to a time period, the time period starting from a time point of the electronic device being powered on, reaching a predetermined threshold, the operations of checking the randomness of the output of the entropy source and generating the reference code are performed after the flag is set, and when the check result indicating that the randomness of the output of the entropy source fails to meet a predetermined criteria, a boot fail warning is issued.

9. The secure boot control circuit of claim 8, wherein when the comparison result indicating that the activation code fails to match the reference code, a boot fail warning is issued.

10. The secure boot control circuit of claim 8, wherein a signing device is coupled to the electronic device to perform an enrollment procedure with the electronic device, and after the enrollment procedure is finished, the signing device sends the activation code to the electronic device, for being written into the secure boot control circuit.

11. The secure boot control circuit of claim 10, wherein the enrollment procedure is configured to determine whether a first shared key of the signing device is identical to a first shared key of the electronic device.

12. The secure boot control circuit of claim 10, wherein the signing device performs a predetermined algorithm based on a first shared key of the signing device and a bit sequence, to generate the activation code for being written into the secure boot control circuit.

13. The secure boot control circuit of claim 12, wherein the bit sequence is the random number sequence received from the electronic device after the enrollment procedure is finished.

14. The secure boot control circuit of claim 12, wherein the second digital circuit performs the predetermined algorithm based on a first shared key of the electronic device and the random number sequence, to generate the reference code.

15. The secure boot control circuit of claim 8, wherein the anti-tampering circuit is implemented based on a customized cell library.

\* \* \* \* \*